(12) United States Patent
Zou et al.

(10) Patent No.: US 12,732,129 B2
(45) Date of Patent: Sep. 8, 2026

(54) WIDE VOLTAGE ADAPTABLE DRIVE AND CONTROL CIRCUIT FOR HAIRDRYERS

(71) Applicant: SHENZHEN JINGXINTAI HOUSEWARE CO., LTD., Shenzhen (CN)

(72) Inventors: Jinshan Zou, Shenzhen (CN); Ming Chen, Shenzhen (CN)

(73) Assignee: SHENZHEN JINGXINTAI HOUSEWARE CO., LTD., Shenzhen (CN)

( * ) Notice: Subject to any disclaimer, the term of this patent is extended or adjusted under 35 U.S.C. 154(b) by 279 days.

(21) Appl. No.: 18/525,389

(22) Filed: Nov. 30, 2023

(65) Prior Publication Data

US 2025/0080028 A1 Mar. 6, 2025

(30) Foreign Application Priority Data

Sep. 1, 2023 (CN) ......................... 202311124620.1

(51) Int. Cl.
*A45D 20/10* (2006.01)
*A45D 20/12* (2006.01)
*H02P 25/03* (2016.01)
*H02P 29/00* (2016.01)

(52) U.S. Cl.
CPC .............. *H02P 29/00* (2013.01); *A45D 20/12* (2013.01); *H02P 25/03* (2016.02)

(58) Field of Classification Search
CPC .......... H02P 29/00; H02P 25/03; A45D 20/12
USPC ........................................................ 318/504
See application file for complete search history.

(56) References Cited

U.S. PATENT DOCUMENTS

2010/0117576 A1* 5/2010 Shimizu .................. H02P 27/08 318/400.26
2017/0034880 A1* 2/2017 O'Neil ................. H05B 45/385
2017/0099929 A1* 4/2017 Ma ............................ H02P 6/16
2019/0190409 A1* 6/2019 Imura ............... H02M 7/53875
2022/0305615 A1* 9/2022 Wang ...................... H02P 27/06
2022/0376629 A1* 11/2022 Xu ...................... H02M 1/0058

* cited by examiner

*Primary Examiner* — Gabriel Agared
(74) *Attorney, Agent, or Firm* — Hawaii Patent Services; Nathaniel K. Fedde; Kenton N. Fedde

(57) ABSTRACT

The present invention discloses a wide voltage adaptable drive and control circuit for hairdryers, which relates to the technical field of AC-DC conversion and comprises a main control-motor driver chip U2, a main power module, a voltage sampling module, and a rectification mode switching module. The voltage sampling module is used to detect a voltage of at least one node in the main power module and provide feedback to the main control-motor driver chip U2. The main control-motor driver chip U2 is used to drive the rectification mode switching module to run based on the voltage fed back by the voltage sampling module, and to switch a running mode of a bridge rectifier sub-module BR1 between a full-wave rectification mode and a voltage doubling rectification mode. The present invention primarily addresses the problem of providing a drive and control circuit for hairdryers with wide voltage adaptability.

10 Claims, 12 Drawing Sheets

+5V
R50
5.1KF
Temp
R40
Temp
J3
1KJ
C14
104
2
1
MX1.25mm 2P

WIDE VOLTAGE ADAPTABLE DRIVE AND CONTROL CIRCUIT FOR HAIRDRYERS

TECHNICAL FIELD

The present invention relates to the technical field of AC-DC conversion, in particular to a wide voltage adaptable drive and control circuit for hairdryers.

BACKGROUND TECHNOLOGY

Hairdryers are used to dry hair and assist in creating various hairstyles and are essential electrical appliances for both household and professional styling purposes.

The widespread use of brushless DC motors has propelled the development of high-speed hairdryers. The transition from traditional electric heaters to electronic ones has also been observed in hairdryers; and controllers of hairdryers are gradually transitioning to electronics, which makes it possible to control hairdryers electronically and accurately and has led to smaller hairdryer sizes, thereby significantly improving portability thereof.

Indeed, a common issue people face when traveling or on business trips is the inconsistency in electrical voltages used by residents in different regions, and these voltages typically range from 100V~130V to 220V~240V. Hairdryers are not exempt from this challenge. If a hairdryer is used with an incompatible voltage, it can lead to situations where the hairdryer either fails to function properly or experiences circuit damage, ranging from minor malfunctions to complete circuit failure.

To sum up, how to provide a wide voltage adaptable drive and control circuit for hairdryers has become an urgent problem to be solved.

SUMMARY OF THE INVENTION

The present invention aims to provide a wide voltage adaptable drive and control circuit for hairdryers, which can adapt to two types of 100 V-130 V and 220-240 V, thereby powering the hairdryer.

In order to achieve above goal, the present invention offers following technical solutions: a wide voltage adaptable drive and control circuit for hairdryers, at least comprises a main control-motor driver chip U2, a main power module, a voltage sampling module, and a rectification mode switching module, wherein the main power module comprises an input and protection sub-module, an electromagnetic compatibility (EMC) filter sub-module, a bridge rectifier sub-module, a pulse-width modulator (PWM) controller U1 and a low-voltage DC output sub-module which are connected in sequence; the voltage sampling module and the rectification mode switching module are respectively connected with the main control-motor driver chip U2 via signals; the voltage sampling module is used to detect a voltage of at least one node in the main power module and provide feedback to the main control-motor driver chip U2; and the main control-motor driver chip U2 is used to drive the rectification mode switching module to run based on the voltage fed back by the voltage sampling module, and to switch a running mode of a bridge rectifier sub-module BR1 between a full-wave rectification mode and a voltage doubling rectification mode.

In the wide voltage adaptable drive and control circuit for hairdryers of above technical solutions, the rectification mode switching module comprises an optocoupler chip PH3 and a switching device TR2; a general-purpose input-output interface of the main control-motor driver chip U2 is connected to an input pole of the optocoupler chip PH3, and an output pole of the optocoupler chip PH3 is connected to a control pole of the switching device TR2, so that the main control-motor driver chip U2 is capable of controlling whether the switching device TR2 is turned on or off through the optocoupler chip PH3; the bridge rectifier sub-module comprises a rectifier bridge BR1 and a capacitor C3; the rectifier bridge BR1 is connected to a terminal of the capacitor C3, and a pole of the switching device TR2 of the rectification mode switching module is connected to another terminal of the capacitor C3; when the switching device TR2 is not turned on, all diodes in the rectifier bridge BR1 work in the circuit, and the bridge rectifier sub-module operates in the full-wave rectification mode; and when the switching device TR2 is turned on, two diodes in the rectifier bridge BR1 and the capacitor C3 work in the circuit, the capacitor C3 is used to store energy, and the bridge rectifier sub-module operates in the voltage doubling rectification mode.

In the wide voltage adaptable drive and control circuit for hairdryers of above technical solutions, a sampling point of the voltage sampling module is located at an output terminal of the bridge rectifier sub-module.

In above technical solutions, the wide voltage adaptable drive and control circuit for hairdryers of the present invention further comprises a motor drive module, wherein the motor drive module comprises a switching device Q1, a switching device Q2, a switching device Q3, a switching device Q4, a switching device Q5 and a switching device Q6; an HOW pin of the main control-motor driver chip U2 is connected to a control pole of the switching device Q1, an LOW pin of the main control-motor driver chip U2 is connected to a control pole of the switching device Q2, and an HOV pin of the main control-motor driver chip U2 is connected to a control pole of the switching device Q3, an LOV pin of the main control-motor driver chip U2 is connected to a control pole of the switching device Q4, and an HOU pin of the main control-motor driver chip U2 is connected to a control pole of the switching device Q5, and an LOU pin of the motor driver chip U2 is connected to a control pole of the switching device Q6; and after the switching device Q1 is connected to the switching device Q2, a W phase of a motor is connected; after the switching device Q3 is connected to the switching device Q4, a V phase of the motor is connected; and after the switching device Q5 is connected to the switching device Q5, a U phase of the motor is connected.

In above technical solutions, the wide voltage adaptable drive and control circuit for hairdryers of the present invention further comprises a motor phase current detection module, wherein the motor phase current detection module comprises an amplifier AMP0, an amplifier AMP1 and an amplifier AMP2; a pole of the switching device Q2 is connected to a non-inverting input terminal of the amplifier AMP0, a pole of the switching device Q6 is connected to a non-inverting input terminal of the amplifier AMP1, and a pole of the switching device Q4 is connected to a non-inverting input terminal of the amplifier AMP2; and an output terminal of the amplifier AMP0, an output terminal of the amplifier AMP1 and an output terminal of the amplifier AMP2 are respectively connected to a phase current input interface of the main control-motor driver chip U2.

In above technical solutions, the wide voltage adaptable drive and control circuit for hairdryers of the present invention further comprises a heater control module, wherein the heater control module comprises an optocoupler chip PH2 and a switching device TR1; the general-purpose input-output interface of the main control-motor driver chip U2 is connected to an input pole of the optocoupler chip PH2, an output pole of the optocoupler chip PH2 is connected to a control pole of the switching device TR1, so that the main control-motor driver chip U2 is capable of controlling whether the switching device TR1 is turned on or off through the optocoupler chip PH2; and one pole of the switching device TR1 is connected with a heater.

In above technical solutions, the wide voltage adaptable drive and control circuit for hairdryers of the present invention further comprises a negative ion drive module, wherein the heater control module comprises an optocoupler chip PH1; the general-purpose input-output interface of the main control-motor driver chip U2 is connected to an input pole of the optocoupler chip PH1, and an output pole of the optocoupler chip PH1 is connected to a negative ion generator.

In above technical solutions, the wide voltage adaptable drive and control circuit for hairdryers of the present invention further comprises a zero-crossing detection module, wherein the zero-crossing detection module comprises an optocoupler chip PH4; and an input pole of the optocoupler chip PH4 is connected to a node of the main power module before the bridge rectifier sub-module, and an output pole of the optocoupler chip PH4 is connected to the general-purpose input-output interface of the main control-motor driver chip U2.

In above technical solutions, the wide voltage adaptable drive and control circuit for hairdryers of the present invention further comprises a key circuit module for inputting control instructions to the main control-motor driver chip U2, and an LED module connected to the main control-motor driver chip U2 for outputting running status of a hairdryer.

In above technical solutions, the wide voltage adaptable drive and control circuit for hairdryers of the present invention comprises at least one temperature detection module connected to the main control-motor driver chip U2.

Compared to the prior art, the present invention has following beneficial effects: the wide voltage adaptable drive and control circuit for hairdryers of the present invention comprises a main control-motor driver chip U2 which can drive a rectification mode switching module to run based on a voltage fed back by the voltage sampling module, and to switch a running mode of a bridge rectifier sub-module BR1 between a full-wave rectification mode and a voltage doubling rectification mode; and the present invention enables functional circuits of hairdryers to operate under two types of AC mains, namely 100V-130V and 220V-240V, which extends the voltage compatibility range of hairdryers, making hairdryers suitable for carrying and using when traveling.

SPECIFIC EMBODIMENTS

The technical solutions in the embodiments of the present invention will be clearly and completely described below with reference to the accompanying drawings in the embodiments of the present invention. Obviously, the described embodiments are only some of the embodiments of the present invention, but not all of the embodiments. Based on the embodiments of the present invention, all other embodiments obtained by those of ordinary skill in the art without creative efforts shall fall within protection scope of the present invention.

An embodiment of the present invention provides a wide voltage adaptable drive and control circuit for hairdryers which is used to convert two types of alternating currents with voltages of 100V to 130V and 220 to 240V into direct currents, thereby supplying power to functional circuits such as motors, heaters, and negative ion generators of hairdryers.

Please refer to FIGS. 1-4, a wide voltage adaptable drive and control circuit for hairdryers of the present embodiment, at least comprises a main control-motor driver chip U2, a main power module, a voltage sampling module, and a rectification mode switching module.

The main control-motor driver chip U2 is a motor drive-specific chip that integrates a motor control engine (ME) and an MCU (Microcontroller Unit) core. That is, the main control-motor driver chip U2 has both main control and motor drive functions. In the present embodiment, a model of the main control-motor driver chip U2 is FU862L.

Figure 1:
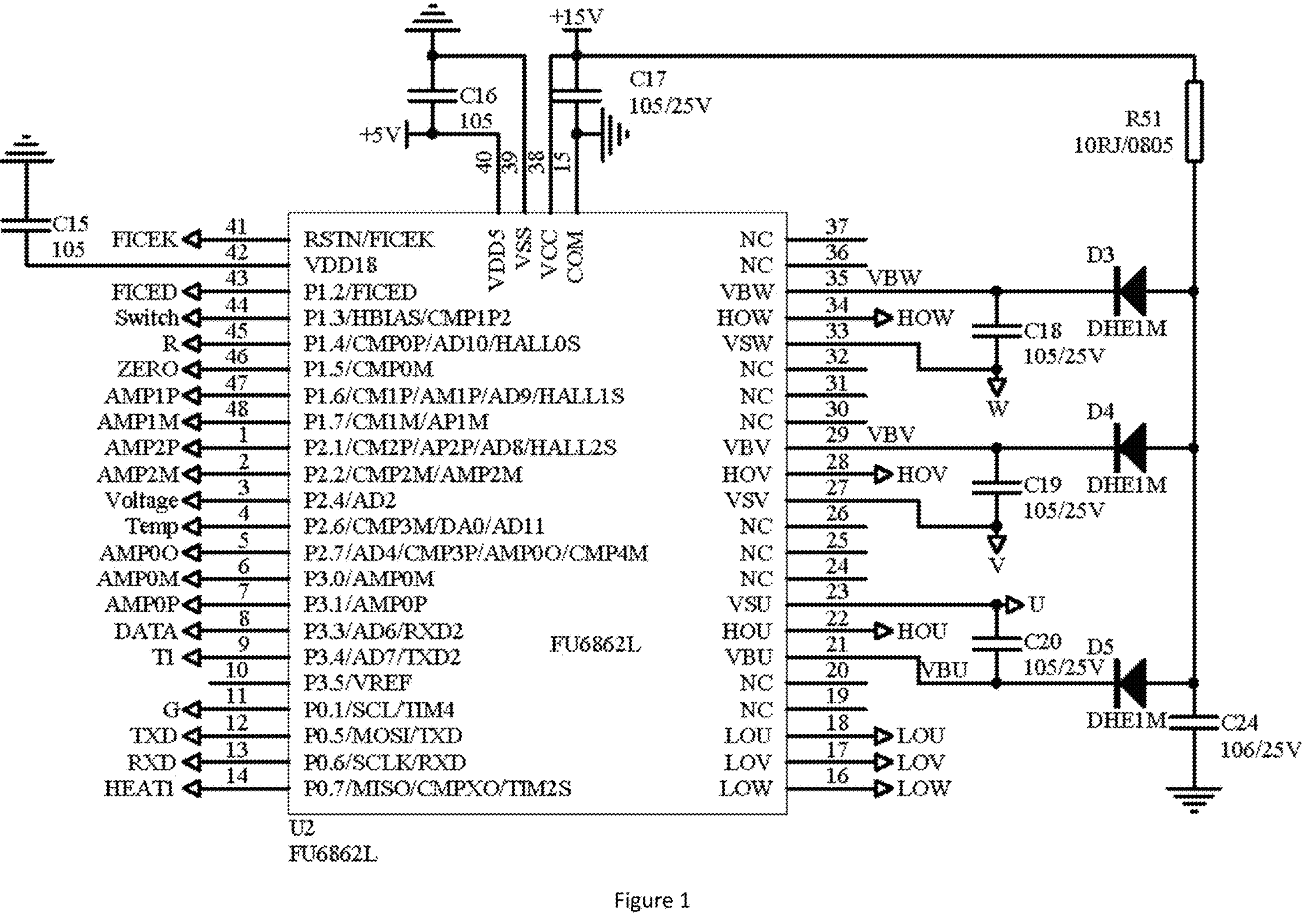
FIG. 1 is a schematic circuit diagram of a main control-motor driver chip U2 in the present invention.

Please refer to FIG. 1, the main power module comprises an input and protection sub-module, an EMC (Electro Magnetic Compatibility) filter sub-module, a bridge rectifier sub-module, a PWM (Pulse Width Modulation) controller U1 and a low-voltage DC output sub-module which are connected in sequence.

In the present embodiment, the input and protection sub-module comprises mains power input interfaces ACL and ACN (wherein the ACL and ACN are two markups for distinguishing and have no other specific meanings), a fuse F1, a thermal device NTC1 and a thermistor VAR1; and the EMC filter sub-module is an EMC filter circuit based on conjugate inductance.

The PWM controller U1 is a current mode PWM controller integrated with a high-voltage MOSFET, and a model thereof is SDH8322. In the present embodiment, the PWM controller U1 is used to provide a stable DC low-voltage power.

The low-voltage DC output sub-module is a filter, namely a voltage stabilizing circuit based on an inductor L1 and a Zener diode ZD1, and is used to further filter and stabilize the DC low-voltage power output by the PWM controller U1 and supply the same to low-voltage functional circuits of a hairdryer.

The voltage sampling module and the rectification mode switching module are respectively connected with the main control-motor driver chip U2 via signals; the voltage sampling module is used to detect a voltage of at least one node in the main power module and provide feedback to the main control-motor driver chip U2; and the main control-motor driver chip U2 is used to drive the rectification mode switching module to run based on the voltage fed back by the voltage sampling module, and to switch a running mode of a bridge rectifier sub-module BR1 between a full-wave rectification mode and a voltage doubling rectification mode.

Figure 2A:
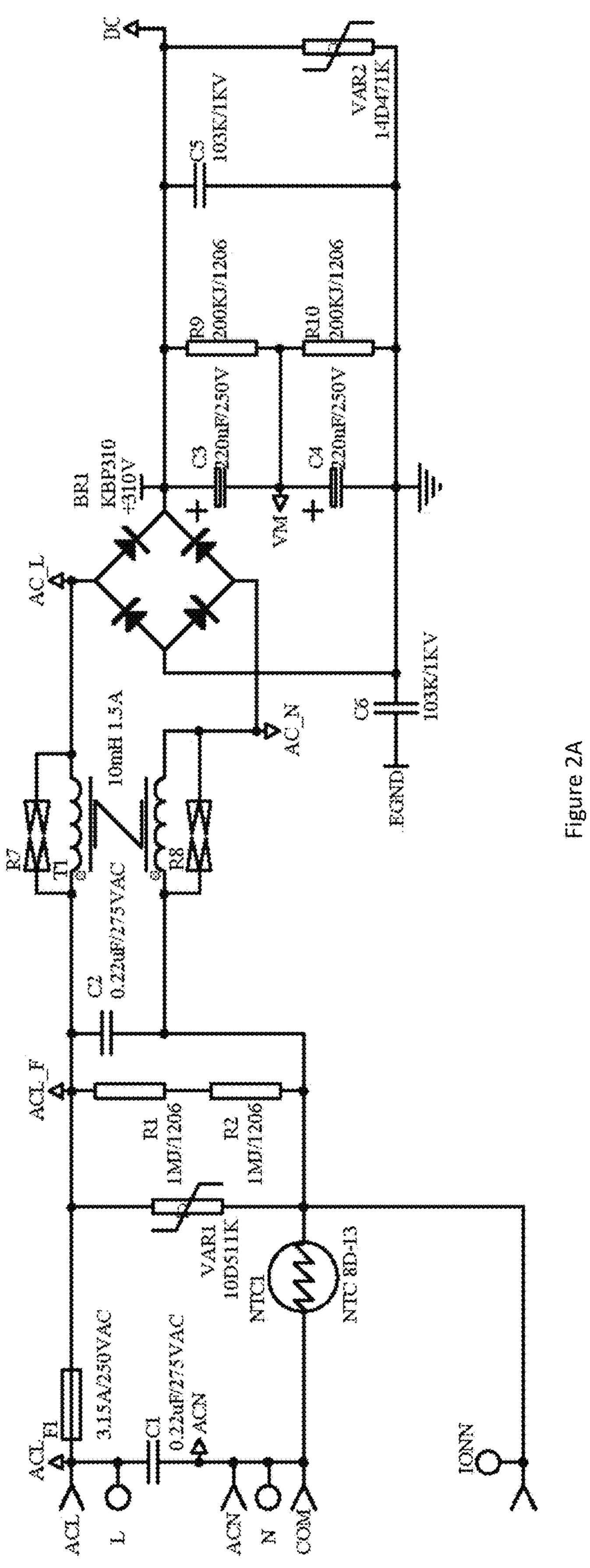
FIG. 2A is one of schematic circuit diagrams of a main power module in the present invention.
Figure 2B:
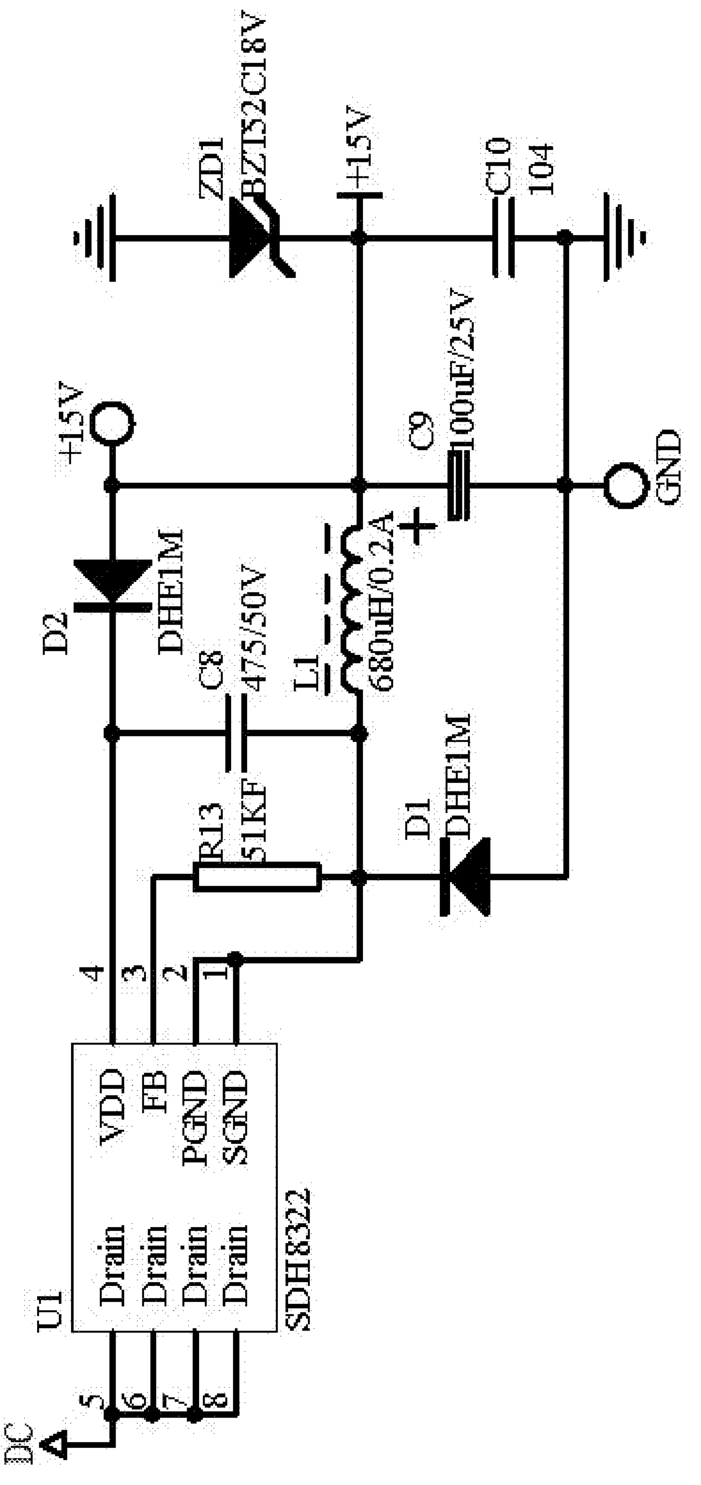
FIG. 2B is a second of schematic circuit diagrams of a main power module in the present invention.
Figure 3:
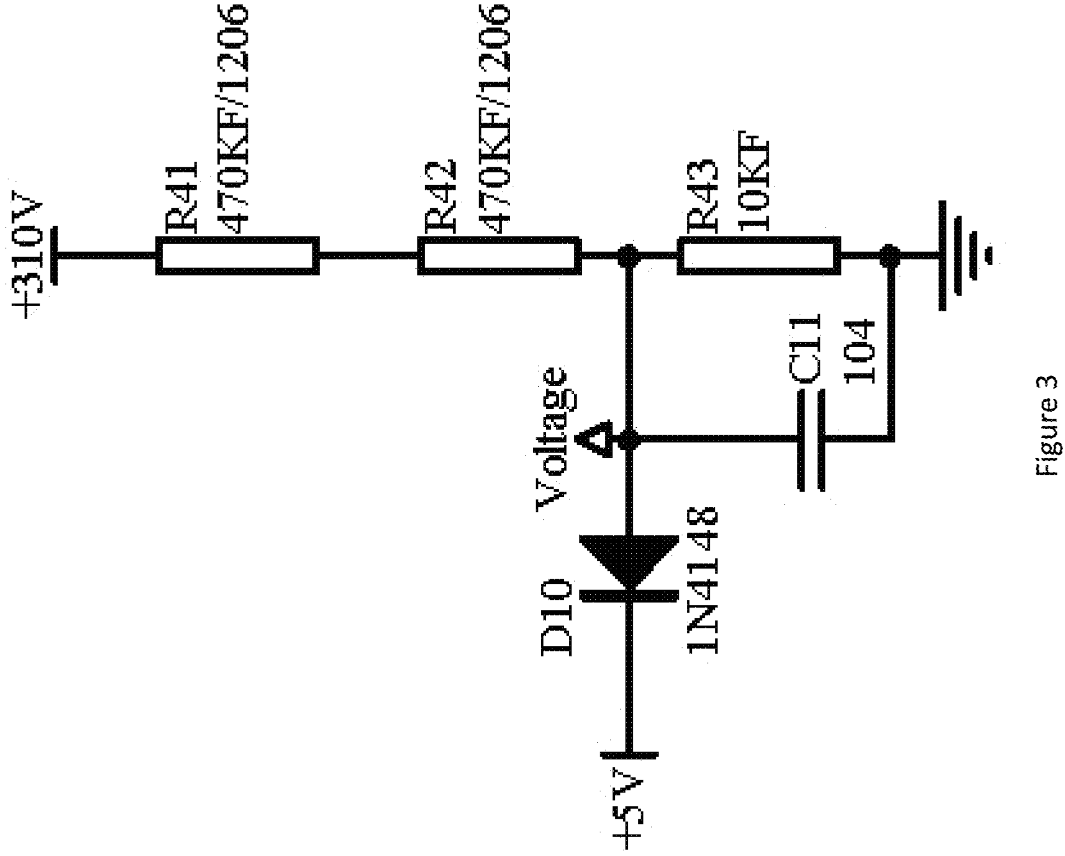
FIG. 3 is a schematic circuit diagram of a voltage sampling module in the present invention.

Please refer to FIG. 2 and FIG. 3 simultaneously, specifically, the rectification mode switching module comprises an optocoupler chip PH3 and a switching device TR2; in the present embodiment, the switching device TR2 is a thyristor of model 138K-800E; a general-purpose input-output interface of the main control-motor driver chip U2 is connected to an input pole (specifically, an anode) of the optocoupler chip PH3, and an output pole of the optocoupler chip PH3 is connected to a control pole of the switching device TR2, so that the main control-motor driver chip U2 is capable of controlling whether the switching device TR2 is turned on or off through the optocoupler chip PH3; the bridge rectifier sub-module comprises a rectifier bridge BR1 and a capacitor C3, wherein the rectifier bridge BR1 comprises four diodes; the rectifier bridge BR1 is connected to a terminal of the capacitor C3, and a pole of the switching device TR2 of the rectification mode switching module is connected to another terminal of the capacitor C3.

When the switching device TR2 is not turned on, all diodes in the rectifier bridge BR1 work in the circuit, and the bridge rectifier sub-module operates in the full-wave rectification mode, which specifically occurs under a voltage of 220-240V; the voltage sampling module detects a voltage of at least one node in the main power supply module and feeds the same back to the main control-motor driver chip U2, when the voltage is within this range, the main control-motor driver chip U2 controls the switching device TR2 to turn off through the optocoupler chip PH3, and the bridge rectifier sub-module operates in the full-wave rectification mode; and at this time, the capacitor C3 does not serve as an energy storage component, and the capacitor C3 and a capacitor C4 act as filtering capacitors for the bridge rectifier sub-module.

When the switching device TR2 is turned on, two diodes in the rectifier bridge BR1 and the capacitor C3 work in the circuit, the capacitor C3 is used to store energy, and the bridge rectifier sub-module operates in the voltage doubling rectification mode, which specifically occurs under a voltage range of 100~130V; the voltage sampling module detects a voltage of at least one node in the main power supply module and feeds the same back to the main control-motor driver chip U2; when the voltage is within this range, the main control-motor driver chip U2 controls the switching device TR2 to conduct through the optocoupler chip PH3, two diodes on a right half of the bridge rectifier BR1 and the capacitor C3 are connected to form a voltage doubling rectifier circuit, and two diodes on a left half of the bridge rectifier BR1 are open-circuited; and at this time, the capacitor C3 serves as an energy storage component, the voltage doubling rectifier circuit consisting of the two diodes on the right half of bridge rectifier BR1 and the capacitor C3 can increase an input voltage close to twice, reaching a voltage range of 220-240V.

Figure 4:
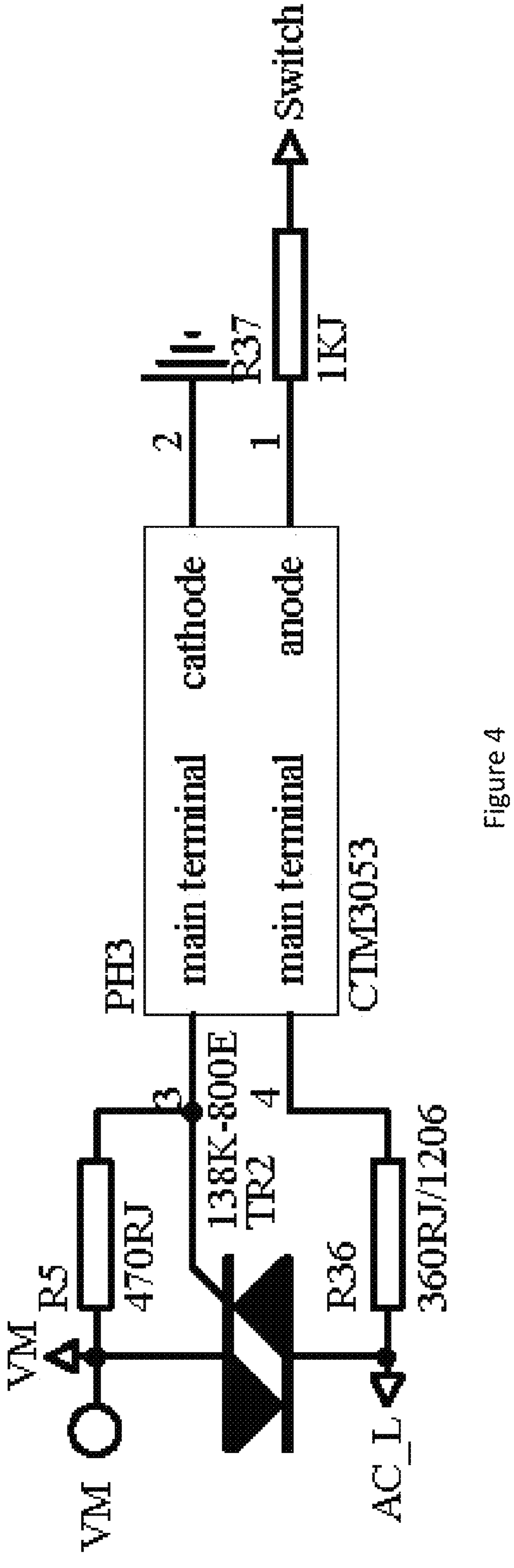
FIG. 4 is a schematic circuit diagram of a rectification mode switching module in the present invention.

Please refer to FIG. 2 and FIG. 4 simultaneously, in the present embodiment the sampling point of the voltage sampling module is located at an output terminal of the bridge rectifier sub-module.

In the present embodiment, the voltage sampling module comprises a resistor R41, a resistor R42 and a resistor R43 connected in sequence, a free end of the resistor R41 is connected to the sampling point, a node between the resistor R42 and the resistor R43 is connected to an analog input interface of the main control-motor driver chip U2 through a diode D10.

Figure 5:
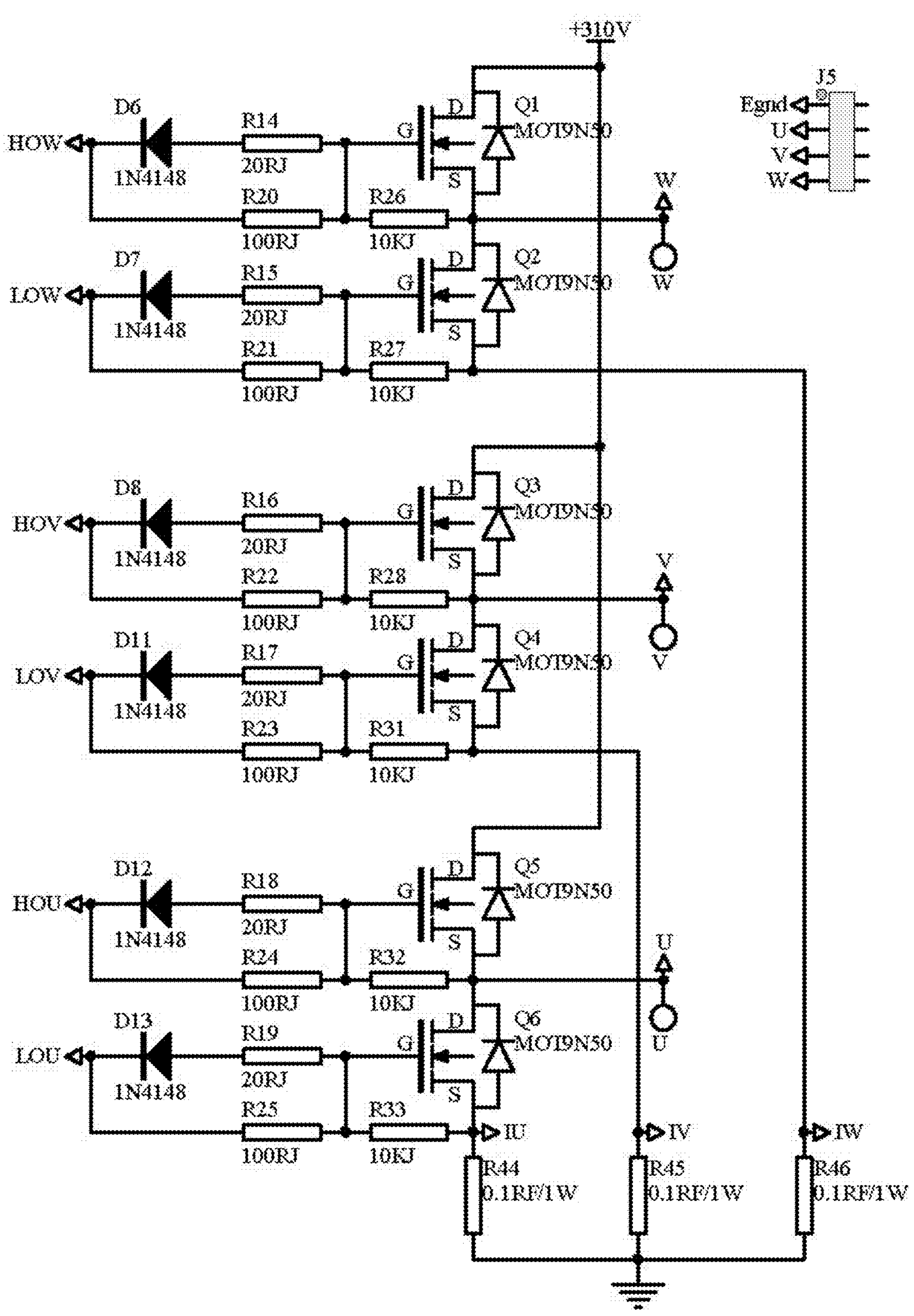
FIG. 5 is a schematic circuit diagram of a motor drive module in the present invention.

Please refer to FIG. 1 and FIG. 5 simultaneously, the wide voltage adaptable drive and control circuit for hairdryers of the present embodiment further comprises a motor drive module, wherein the motor drive module comprises a switching device Q1, a switching device Q2, a switching device Q3, a switching device Q4, a switching device Q5 and a switching device Q6; an HOW pin of the main control-motor driver chip U2 is connected to a control pole of the switching device Q1, an LOW pin of the main control-motor driver chip U2 is connected to a control pole of the switching device Q2, and an HOV pin of the main control-motor driver chip U2 is connected to a control pole of the switching device Q3, an LOV pin of the main control-motor driver chip U2 is connected to a control pole of the switching device Q4, and an HOU pin of the main control-motor driver chip U2 is connected to a control pole of the switching device Q5, and an LOU pin of the motor driver chip U2 is connected to a control pole of the switching device Q6; and after the switching device Q1 is connected to the switching device Q2, a W phase of a motor is connected; after the switching device Q3 is connected to the switching device Q4, a V phase of the motor is connected; after the switching device Q5 is connected to the switching device Q5, a U phase of the motor is connected.

As mentioned above, the HOW pin, LOW pin, HOV pin, LOV pin, HOU pin and LOU pin of the main control-motor driver chip U2 are all dedicated output pins of the motor control engine (ME) of the main control-motor driver chip U2, which are used to drive the motor.

Since the main control-motor driver chip U2 has integrated the motor control engine (ME) and preset motor driver program, a motor speed can be easily controlled just by simply making the above circuit connections.

Figure 6:
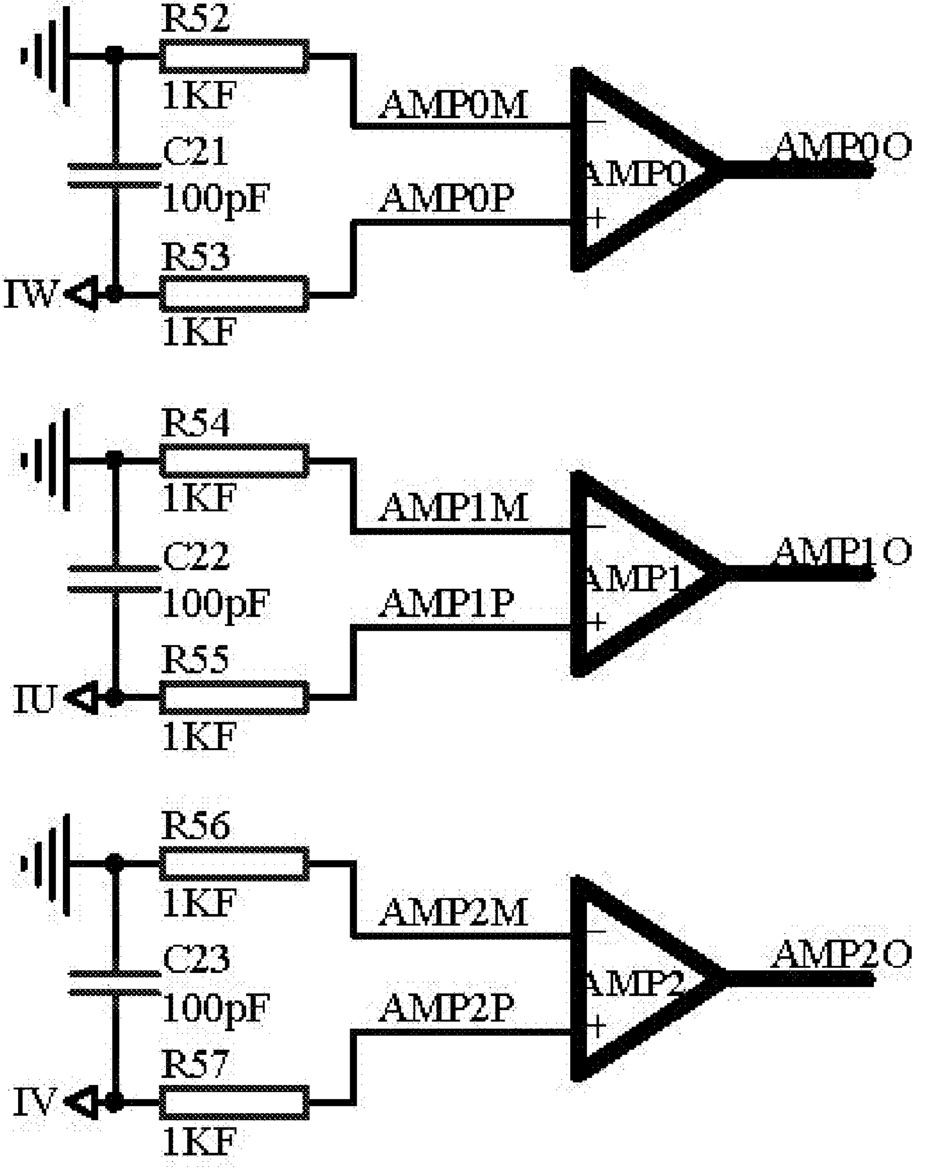
FIG. 6 is a schematic circuit diagram of a motor phase current detection module in the present invention.

Please refer to FIG. 1 and FIG. 6 simultaneously, the wide voltage adaptable drive and control circuit for hairdryers of the present embodiment further comprises a motor phase current detection module, wherein the motor phase current detection module comprises an amplifier AMP0, an amplifier AMP1 and an amplifier AMP2; a pole of the switching device Q2 is connected to a non-inverting input terminal of the amplifier AMP0, a pole of the switching device Q6 is connected to a non-inverting input terminal of the amplifier AMP1, and a pole of the switching device Q4 is connected to a non-inverting input terminal of the amplifier AMP2; and an output terminal of the amplifier AMP0, an output terminal of the amplifier AMP1 and an output terminal of the amplifier AMP2 are respectively connected to a phase current input interface of the main control-motor driver chip U2.

The motor phase current detection module is used to feedback a phase current of the motor to the main control-motor driver chip U2, thereby achieving closed-loop speed control and over-current protection of the motor.

Figures 7, 8:
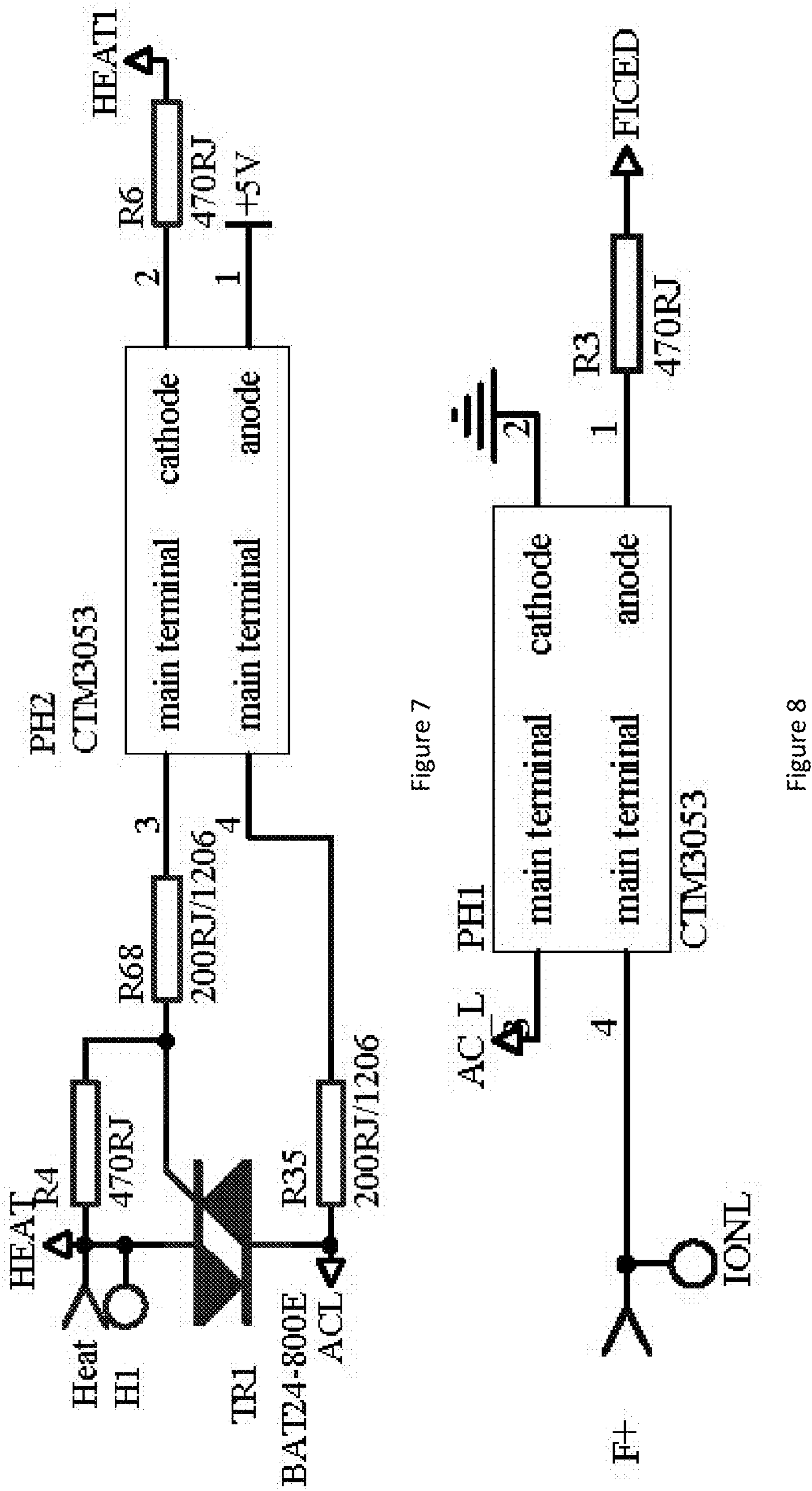
FIG. 7 is a schematic circuit diagram of a heater control module in the present invention.
FIG. 8 is a schematic circuit diagram of a negative ion drive module in the present invention.

Please refer to FIG. 1 and FIG. 7 simultaneously, the wide voltage adaptable drive and control circuit for hairdryers of the present embodiment further comprises a heater control module, wherein the heater control module comprises an optocoupler chip PH2 and a switching device TR1, and the switching device TR1 is a thyristor of model number BAT24-800E; the general-purpose input-output interface of the main control-motor driver chip U2 is connected to an input pole of the optocoupler chip PH2, an output pole of the optocoupler chip PH2 is connected to a control pole of the switching device TR1, so that the main control-motor driver chip U2 is capable of controlling whether the switching device TR1 is turned on or off through the optocoupler chip PH2; and one pole of the switching device TR1 is connected with a heater, and it should be noted that the heater comprises an electric heating wire, an electric heating network or a honeycomb electric heater.

Figure 9:
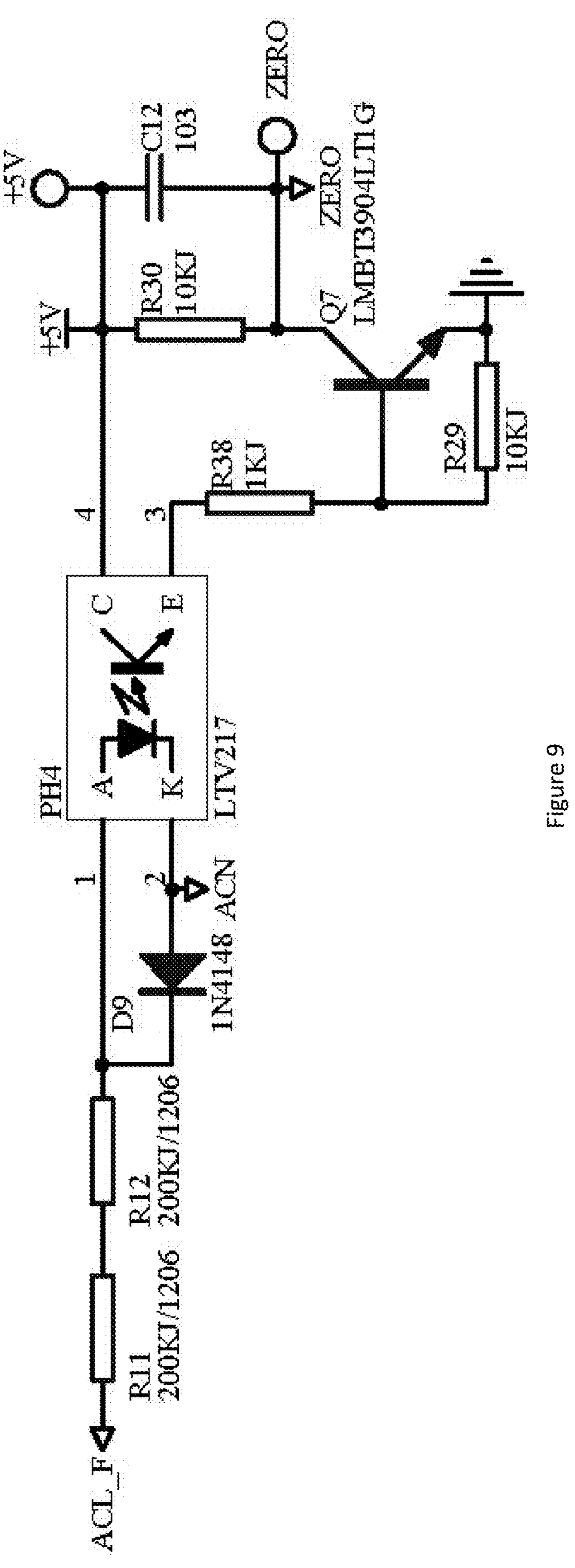
FIG. 9 is a schematic circuit diagram of a zero-crossing detection module in the present invention.

Please refer to FIG. 1 and FIG. 8 simultaneously, the wide voltage adaptable drive and control circuit for hairdryers of the present embodiment further comprises a negative ion drive module, wherein the heater control module comprises an optocoupler chip PH1; the general-purpose input-output interface of the main control-motor driver chip U2 is connected to an input pole of the optocoupler chip PH1, and an output pole of the optocoupler chip PH1 is connected to a negative ion generator, so that the main master-motor drive chip U2 can drive the negative ion generator to generate negative ions Please refer to FIG. 1 and FIG. 9 simultaneously, the wide voltage adaptable drive and control circuit for hairdryers of the present embodiment further comprises a zero-crossing detection module, wherein the zero-crossing detection module comprises an optocoupler chip PH4, and the model of the optocoupler chip PH4 is LTV217 in this embodiment; an input pole of the optocoupler chip PH4 is connected to a node of the main power module before the bridge rectifier sub-module, and an output pole of the optocoupler chip PH4 is connected to the general-purpose input-output interface of the main control-motor driver chip U2; and through the zero-crossing detection, it is convenient for the main control-motor drive chip U2 to accurately control on-off timing of the motor drive module.

Figure 10:
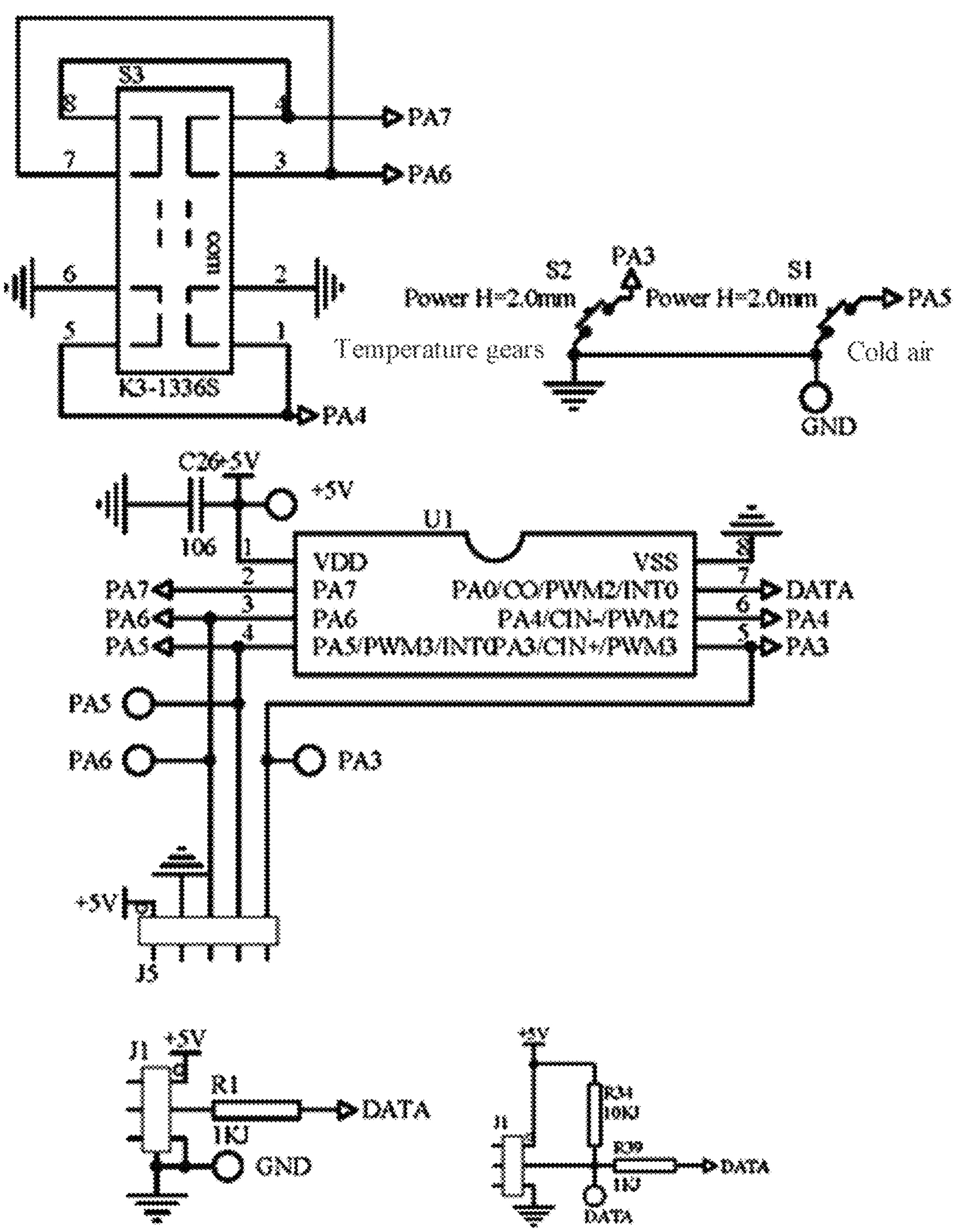
FIG. 10 is a schematic circuit diagram of a key circuit module in the present invention.

Please refer to FIG. 1 and FIG. 10 simultaneously, the wide voltage adaptable drive and control circuit for hairdryers of the present embodiment further comprises a key circuit module for inputting control instructions to the main control-motor driver chip U2, in the present embodiment, the key circuit module comprises a push switch S1, a push switch S2 and a toggle switch S3, the push switch S1, and the push switch S2 and the switch S3 are all connected to a digital chip U3, and then through the digital chip U3 connected to a communication interface of the main control-motor driver chip U2 to save pins of the main control-motor driver chip U2.

Figure 11:
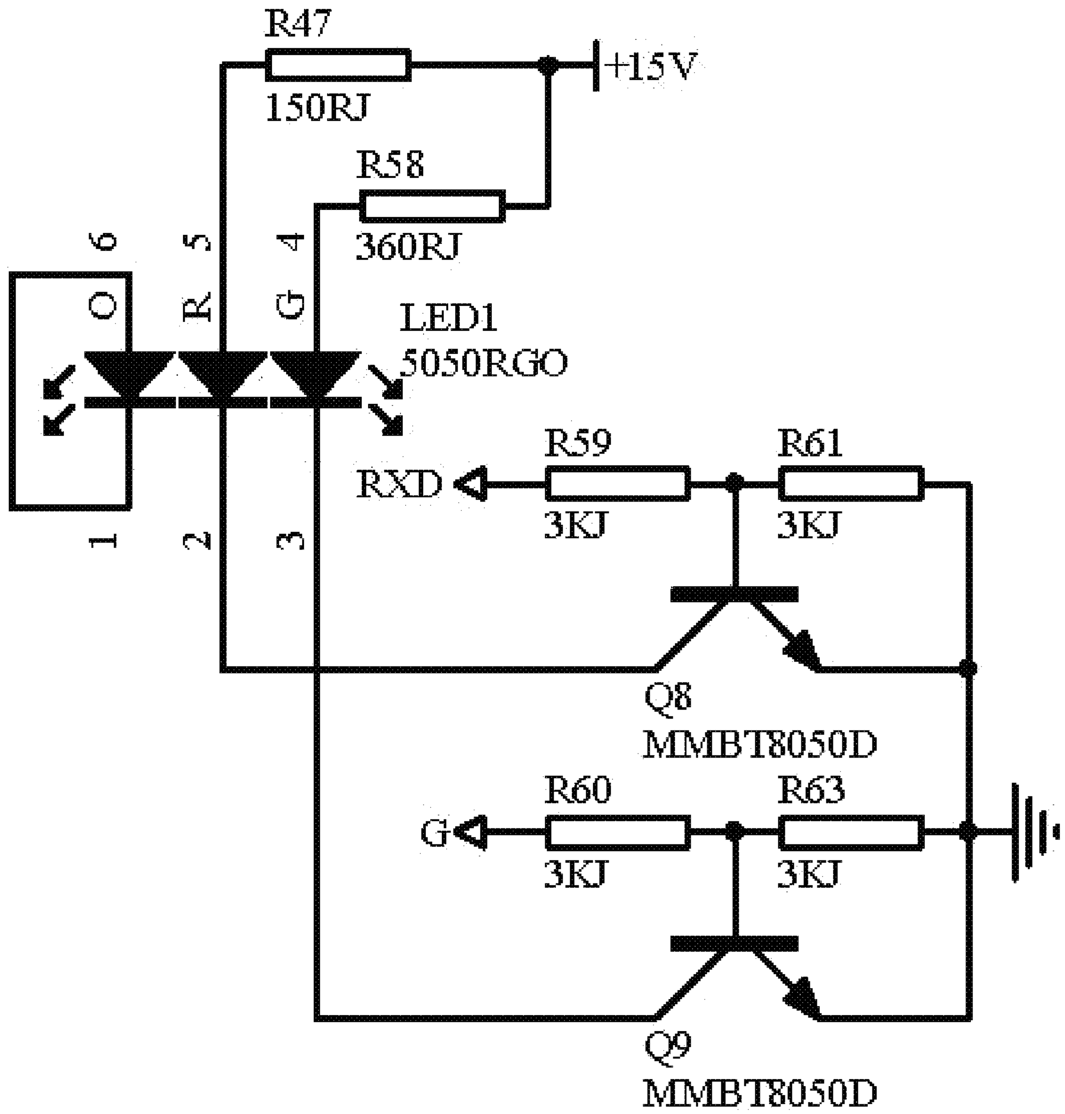
FIG. 11 is a schematic circuit diagram of an LED module in the present invention.

Please refer to FIG. 1 and FIG. 11 simultaneously, the wide voltage adaptable drive and control circuit for hairdryers of the present embodiment further comprises an LED module connected to the main control-motor driver chip U2 for outputting running status of a hairdryer; in the present embodiment, the LED module comprises an orange LED O, a red LED R and a green LED G, wherein the red LED R is driven by a switch tube Q8, and the green LED G is driven by a switch tube Q9, control poles of the switch tube Q8 and the switch tube Q9 are respectively connected with universal input-output pins of the main master-motor driver chip U2, thus, the main control-motor driver chip U2 controls the on and off of the red light-emitting diode R and the green light-emitting diode G; and through independent colored light, mixed colored light and breathing state of the orange LED O, the red LED R and the green LED G, the operating status of a hairdryer (such as a wind speed gear and a temperature gear) can be output.

Figures 12, 13:
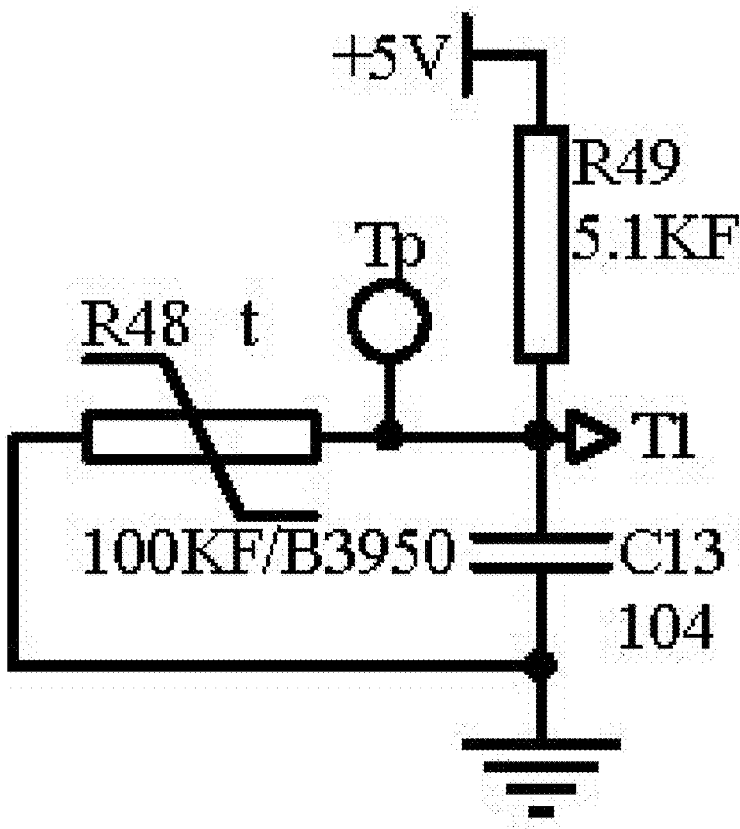
FIG. 12 is a first schematic circuit diagram of a temperature detection module in the present invention.
FIG. 13 is a second schematic circuit diagram of a temperature detection module in the present invention.

Please refer to FIG. 1, FIG. 12 and FIG. 13 simultaneously, the wide voltage adaptable drive and control circuit for hairdryers of the present embodiment further comprises at least one temperature detection module connected to the main control-motor driver chip U2; in the present embodiment, FIG. 12 shows a temperature detection module based on a thermistor R48, the thermistor R48 is connected to the analog input interface of the main control-motor driver chip U2, the thermistor R48 is integrated on a PCB of a hairdryer drive and control circuit with wide voltage adaptation, and is used to detect the temperature of the PCB and feed the same back to the main control-motor driver chip U2; in the present embodiment, FIG. 13 shows a temperature detection module connected to a temperature sensor or a thermal component through a connector J3, and the temperature detection module is connected to the analog input interface of the main control-motor driver chip U2 through a signal port and comprises a temperature sensor or a thermal component arranged near the heater or an air outlet of the hairdryer to detect the heater temperature or air outlet temperature of the hairdryer.

The wide voltage adaptable drive and control circuit for hairdryers of the present embodiment comprises a main control-motor driver chip U2 which can drive running of a rectification mode switching module based on a voltage fed back by the voltage sampling module, thereby switching a running mode of a bridge rectifier sub-module BR1 between a full-wave rectification mode and a voltage doubling rectification mode; and the present invention enables functional circuits of hairdryers to operate under two types of AC mains, namely 100V-130V and 220V-240V, which extends the voltage compatibility range of hairdryers, making hairdryers suitable for carrying and using when traveling.

Although embodiments of the present invention have been shown and described, it will be apparent to those skilled in the art that various changes, modifications, substitutions, and variations can be made to these embodiments without departing from principles and spirit of the present invention. The scope of the present invention is defined by the appended claims and their equivalents.

The invention claimed is:

1. A wide voltage adaptable drive and control circuit for hairdryers, comprising a main control-motor driver chip U2, a main power module, a voltage sampling module, and a rectification mode switching module, wherein the main power module comprises an input and protection sub-module, an electromagnetic compatibility (EMC) filter sub-module, a bridge rectifier sub-module, a pulse-width modulator (PWM) controller U1 and a low-voltage DC output sub-module which are connected in sequence;

signal transmission in between the voltage sampling module, the rectification mode switching module and the main control-motor driver chip U2 is configured;

the voltage sampling module is used to detect a voltage of at least one node in the main power module and provide feedback to the main control-motor driver chip U2; and the main control-motor driver chip U2 is used to drive the rectification mode switching module to run based on the voltage fed back by the voltage sampling module, and to switch a running mode of a bridge rectifier sub-module BR1 between a full-wave rectification mode and a voltage doubling rectification mode.

2. The wide voltage adaptable drive and control circuit for hairdryers according to claim 1, wherein the rectification mode switching module comprises an optocoupler chip PH3 and a switching device TR2;

a general-purpose input-output interface of the main control-motor driver chip U2 is connected to an input pole of the optocoupler chip PH3, and an output pole of the optocoupler chip PH3 is connected to a control pole of the switching device TR2, so that the main control-motor driver chip U2 is capable of controlling whether the switching device TR2 is turned on or off through the optocoupler chip PH3;

the bridge rectifier sub-module comprises a rectifier bridge BR1 and a capacitor C3;

the rectifier bridge BR1 is connected to a terminal of the capacitor C3, and a pole of the switching device TR2 of the rectification mode switching module is connected to another terminal of the capacitor C3;

when the switching device TR2 is not turned on, all diodes in the rectifier bridge BR1 work in the circuit, and the bridge rectifier sub-module operates in the full-wave rectification mode;

when the switching device TR2 is turned on, two diodes in the rectifier bridge BR1 and the capacitor C3 work in the circuit, the capacitor C3 is used to store energy, and the bridge rectifier sub-module operates in the voltage doubling rectification mode.

3. The wide voltage adaptable drive and control circuit for hairdryers according to claim 1, wherein a sampling point of the voltage sampling module is located at an output terminal of the bridge rectifier sub-module.

4. The wide voltage adaptable drive and control circuit for hairdryers according to claim 1 further comprising a motor drive module, wherein the motor drive module comprises a switching device Q1, a switching device Q2, a switching device Q3, a switching device Q4, a switching device Q5 and a switching device Q6;

an HOW pin of the main control-motor driver chip U2 is connected to a control pole of the switching device Q1, an LOW pin of the main control-motor driver chip U2 is connected to a control pole of the switching device Q2, and an HOV pin of the main control-motor driver chip U2 is connected to a control pole of the switching device Q3, an LOV pin of the main control-motor driver chip U2 is connected to a control pole of the switching device Q4, and an HOU pin of the main control-motor driver chip U2 is connected to a control pole of the switching device Q5, and an LOU pin of the motor driver chip U2 is connected to a control pole of the switching device Q6; and after the switching device Q1 is connected to the switching device Q2, a W phase of a motor is connected; after the switching device Q3 is connected to the switching device Q4, a V phase of the motor is connected; and after the switching device Q5 is connected to the switching device Q5, a U phase of the motor is connected.

5. The wide voltage adaptable drive and control circuit for hairdryers according to claim 4 further comprising a motor phase current detection module, wherein the motor phase current detection module comprises an amplifier AMP0, an amplifier AMP1 and an amplifier AMP2;

a pole of the switching device Q2 is connected to a non-inverting input terminal of the amplifier AMP0, a pole of the switching device Q6 is connected to a non-inverting input terminal of the amplifier AMP1, and a pole of the switching device Q4 is connected to a non-inverting input terminal of the amplifier AMP2; and an output terminal of the amplifier AMP0, an output terminal of the amplifier AMP1 and an output terminal of the amplifier AMP2 are respectively connected to a phase current input interface of the main control-motor driver chip U2.

6. The wide voltage adaptable drive and control circuit for hairdryers according to claim 1 further comprising a heater control module, wherein the heater control module comprises an optocoupler chip PH2 and a switching device TR1;

the general-purpose input-output interface of the main control-motor driver chip U2 is connected to an input pole of the optocoupler chip PH2, an output pole of the optocoupler chip PH2 is connected to a control pole of the switching device TR1, so that the main control-motor driver chip U2 is capable of controlling whether the switching device TR1 is turned on or off through the optocoupler chip PH2; and one pole of the switching device TR1 is connected with a heater.

7. The wide voltage adaptable drive and control circuit for hairdryers according to claim 1 further comprising a negative ion drive module, wherein the heater control module comprises an optocoupler chip PH1; and the general-purpose input-output interface of the main control-motor driver chip U2 is connected to an input pole of the optocoupler chip PH1, and an output pole of the optocoupler chip PH1 is connected to a negative ion generator.

8. The wide voltage adaptable drive and control circuit for hairdryers according to claim 1 further comprising a zero-crossing detection module, wherein the zero-crossing detection module comprises an optocoupler chip PH4; and an input pole of the optocoupler chip PH4 is connected to a node of the main power module before the bridge rectifier sub-module, and an output pole of the optocoupler chip PH4 is connected to the general-purpose input-output interface of the main control-motor driver chip U2.

9. The wide voltage adaptable drive and control circuit for hairdryers according to claim 1 further comprising a key circuit module for inputting control instructions to the main control-motor driver chip U2, and an LED module connected to the main control-motor driver chip U2 for outputting running status of a hairdryer.

10. The wide voltage adaptable drive and control circuit for hairdryers according to claim 1 further comprising at least one temperature detection module connected to the main control-motor driver chip U2.

* * * * *